(12) United States Patent
Bosg et al.

(10) Patent No.: US 6,461,140 B1
(45) Date of Patent: Oct. 8, 2002

(54) SYSTEM FOR INJECTING COMPOSITE SUBSTANCE INSIDE A FORMING MOULD

(75) Inventors: Patrick Bosg, Saint Barthélémy de Vals; Laurent Vergne, Larnage, both of (FR)

(73) Assignee: INOPLAST of Le Berlioz Domaine de la Gare, Annonay (FR)

( * ) Notice: Subject to any disclaimer, the term of this patent is extended or adjusted under 35 U.S.C. 154(b) by 0 days.

(21) Appl. No.: 09/355,721

(22) PCT Filed: Jan. 20, 1998

(86) PCT No.: PCT/FR98/00101

§ 371 (c)(1),
(2), (4) Date: Aug. 3, 1999

(87) PCT Pub. No.: WO98/35810

PCT Pub. Date: Aug. 20, 1998

(30) Foreign Application Priority Data

Feb. 13, 1997 (FR) .............................. 97 01912

(51) Int. Cl.⁷ .............................................. B29C 45/18
(52) U.S. Cl. ......................... 425/548; 425/585; 425/586
(58) Field of Search ................................ 425/557, 585, 425/586, 547, 548; 138/119, 120, 150

(56) References Cited

U.S. PATENT DOCUMENTS

| 3,694,529 A | * | 9/1972 | Josephsen et al. ............ 264/48 |
| 4,107,946 A | * | 8/1978 | Potter ........................ 62/514 R |
| 4,221,408 A | * | 9/1980 | Lochte et al. ............... 285/276 |
| 4,234,216 A | * | 11/1980 | Swanson et al. .............. 285/93 |
| 4,268,241 A |   | 5/1981 | Rees et al. |
| 5,382,147 A | * | 1/1995 | Miura et al. ................. 425/144 |
| 5,538,296 A | * | 7/1996 | Horton ........................ 285/276 |
| 5,540,580 A |   | 7/1996 | Takada |
| 5,711,895 A | * | 1/1998 | Takigawa et al. .............. 252/68 |
| 5,984,374 A | * | 11/1999 | Esser ......................... 285/179 |
| 6,134,893 A | * | 10/2000 | Bonn .......................... 62/50.7 |

FOREIGN PATENT DOCUMENTS

| FR |  | 991056 A | * | 7/1949 | ................. 138/119 |
| FR |  | 2425318 |  | 7/1979 |  |
| FR |  | 2629388 |  | 6/1989 |  |

OTHER PUBLICATIONS

English Patent Abstract of Japan, 08309821, Nov. 26, 1996, Method and Apparatus for Molding, Takatsuka Masahiro.
Systeme d'injection BMC "INOROC", W. Maertens Spiertz, Composites, vol. 31, No. 3 May 1991–Jun. 1991, Paris, France, pp. 342–346.

* cited by examiner

Primary Examiner—Jan H. Silbaugh
Assistant Examiner—Emmanuel Luk
(74) Attorney, Agent, or Firm—Dowell & Dowell, P.C.

(57) ABSTRACT

A system for injecting a composite substance inside a forming mould comprising a supplying device and at least one measuring device and which includes at least one line formed of articulated tube sections which are double-sheathed so as to enable a heat exchanging fluid to circulate therein. The system enables limitation of head loss and control of temperature of the composite substance. A device injecting the substance inside the mould can be mounted on a movable part of the mould.

9 Claims, 3 Drawing Sheets

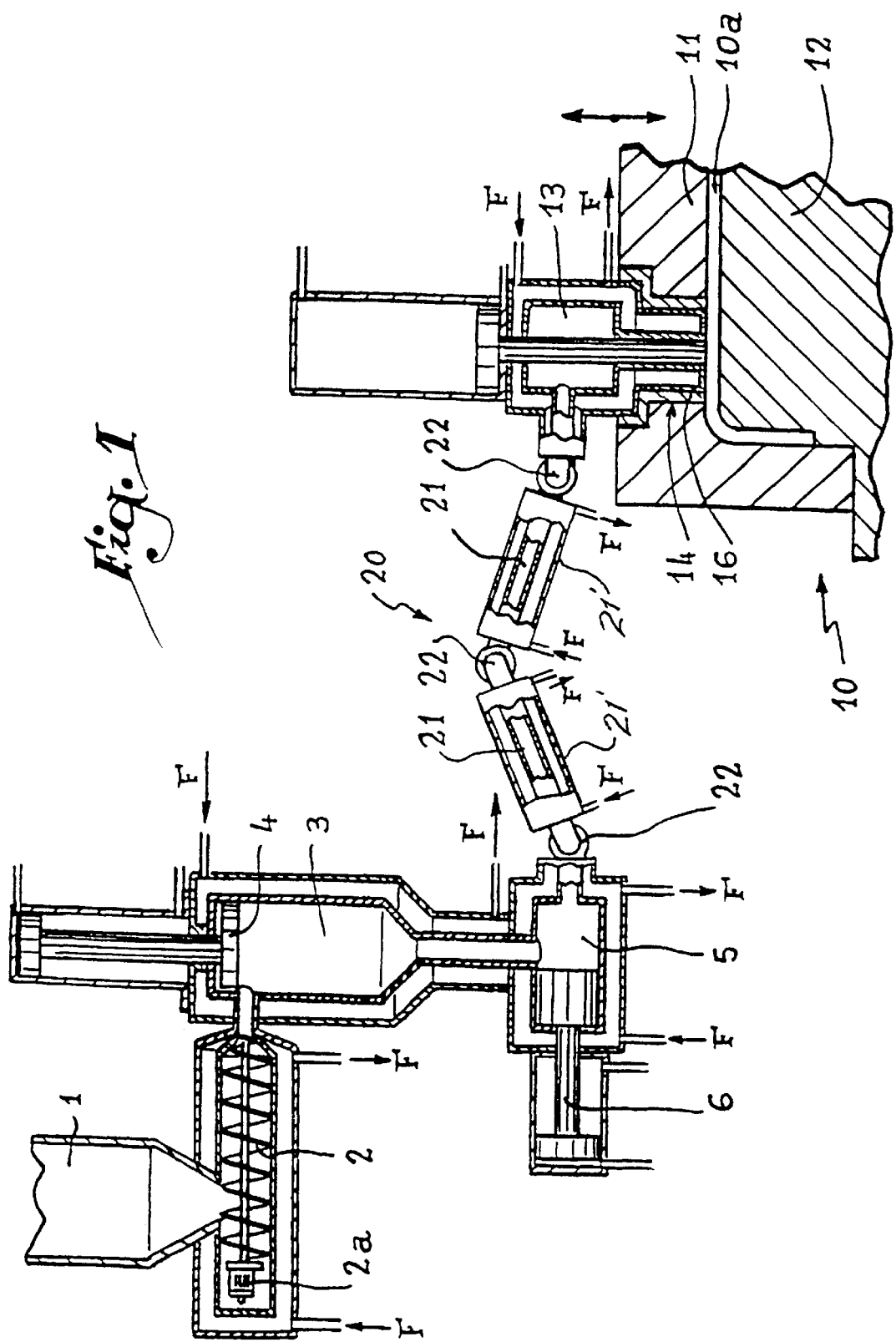

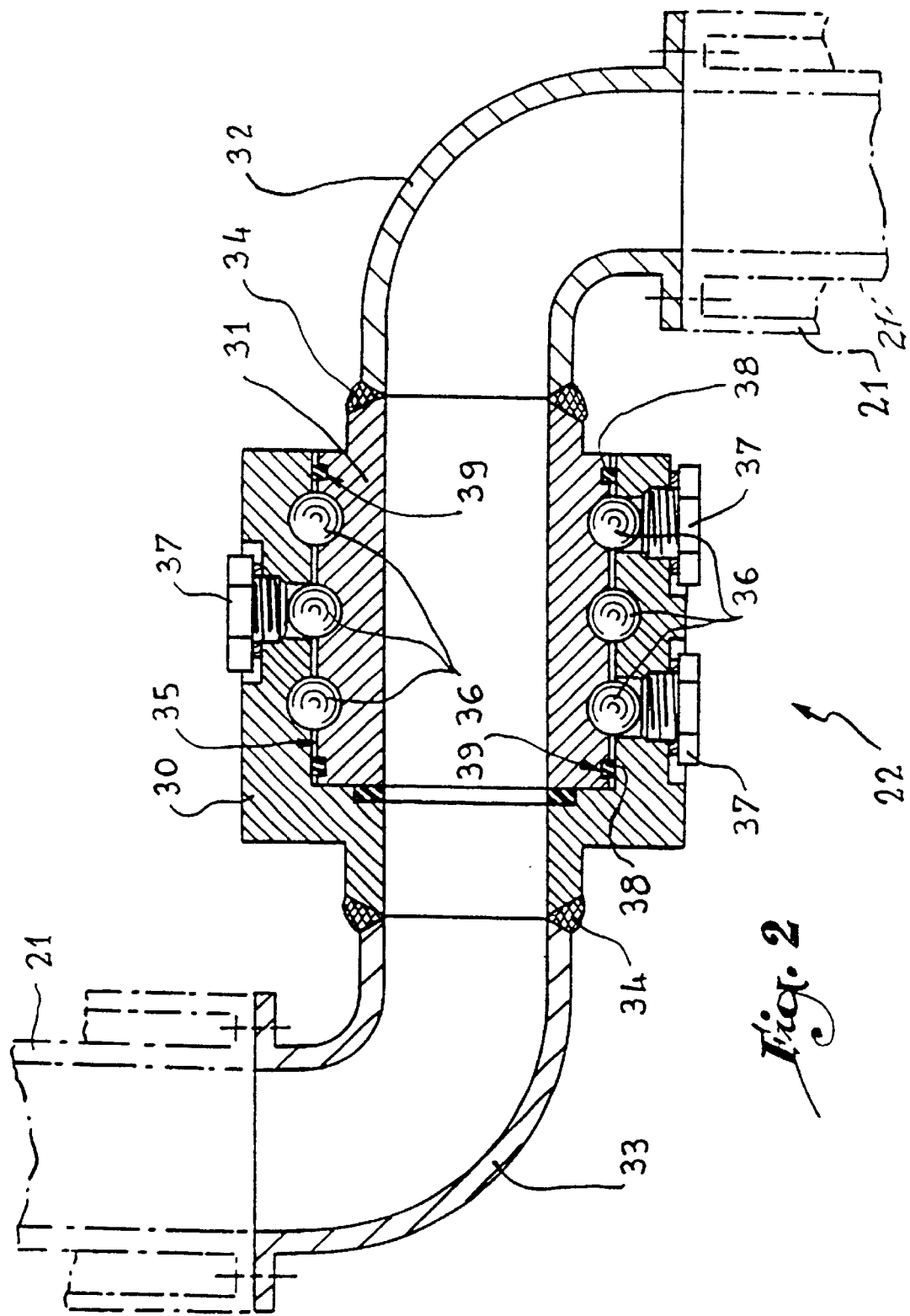

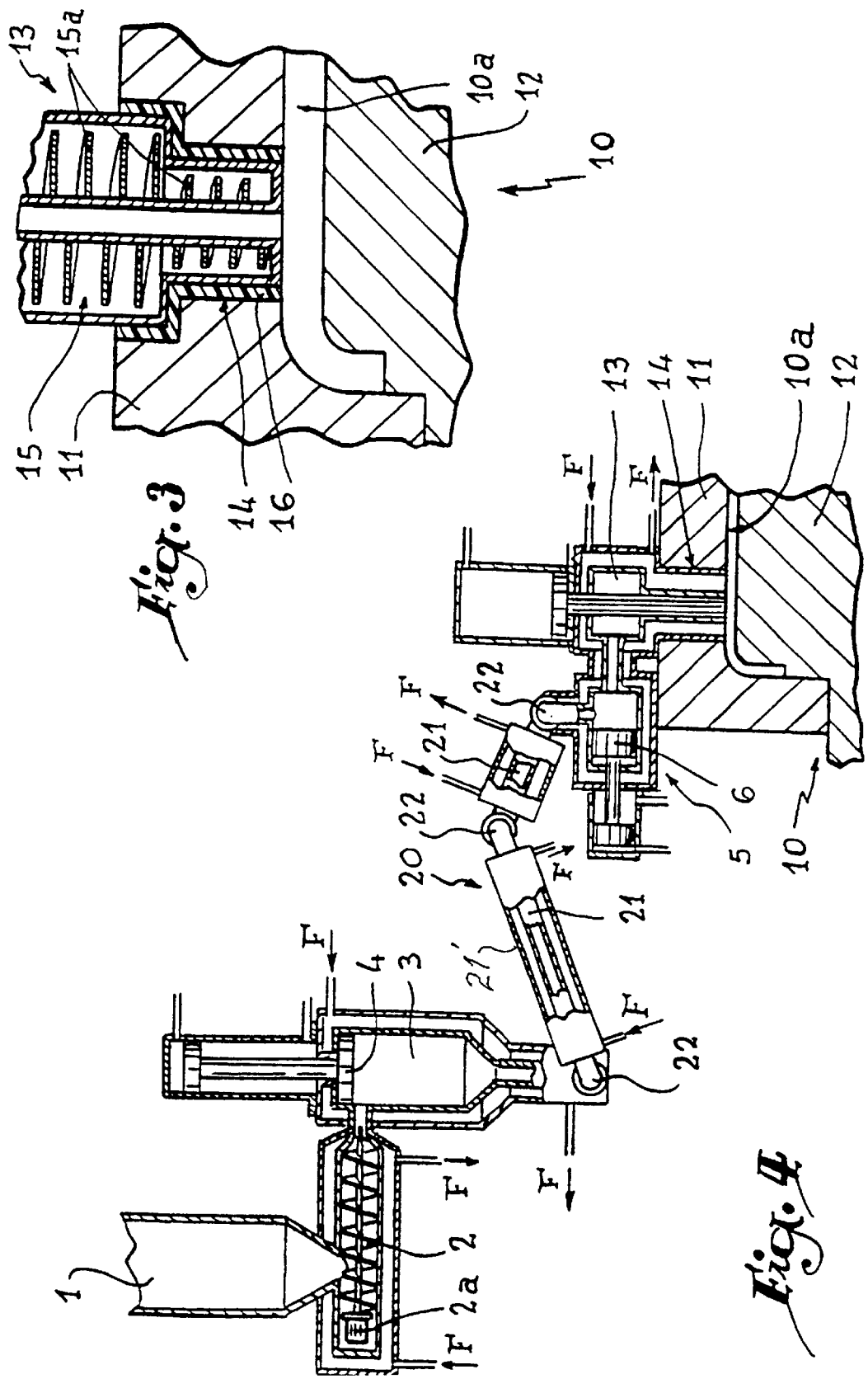

SYSTEM FOR INJECTING COMPOSITE SUBSTANCE INSIDE A FORMING MOULD

BACKGROUND OF THE INVENTION

1. Field of the Invention

The invention relates to a system for injecting composite substances inside a forming mould.

2. Description of the Related Art

A composite moulding substance generally comprises a resin and appropriate reinforcing fibers or fillers. Patent Application FR-A-2 629 388 discloses an apparatus for injecting composite substance inside a forming mould, comprising one or more measuring devices, of the type incorporating a mobile piston, connected to a common supply device, likewise of the piston type, each measuring device being associated with an injection device mounted on the mould. This device is efficient for moulding composite substances comprising a thermosettable resin.

However, thermosettable resins have a relatively high density, of the order of 1.4 to 1.9, and generally do not make it possible to assemble the pieces made by a simple cooperation of shape, i.e. by clipping. Now, such a clipping may be desirable for bodywork or structural elements of an automobile vehicle, such as a radiator grill, a wing or an interior or exterior fitting. It has therefore been envisaged to use thermoplastics resins whose density is lower and which allow fixation of the pieces by elastic deformation.

One constraint of thermoplastics resins resides in the fact that they must be injected in the forming mould at a temperature of the order of 220 to 290° C., the pressure of moulding being of the order of 300 to 350 bars. These values are substantially higher than the corresponding values for thermosettable resins, which are about 170° C. and from 100 to 250 bars, respectively.

On the other hand, as a function of the geometry of the piece to be moulded, it is sometimes necessary that the injection device be installed on a mobile part of the mould in order that the mark possibly left on the finished piece at the point of injection be located in a concealed part of the piece once the latter is mounted. It is then necessary to provide a system of supply moulding substance to the injector which allows for movements of the latter due to the movements of the mould. It has been envisaged to install in the known device of FR-2 629 388 a flexible pipe between the measuring device and the injection device.

However, such a flexible pipe should be made with a reinforced pipe which is particularly expensive. Moreover, the geometry of the pipe would vary as a function of the position of the mobile part of the mould, with the result that the head losses induced by this pipe would be considerable and variable. Moreover, the known technology does not make it possible to use flexible pipes of large diameter at the pressures envisaged, with the result that the head losses induced in a flexible line are considerable. It is then necessary that the common supply device operate at very high pressure in order to attain, at the level of the impression of the mould, the necessary 300 to 350 bars when moulding a thermoplastics resin.

In addition, a flexible line necessarily comprises two connections allowing it to be connected at its two ends to a fluid circuit. Such connections necessarily present a reduction in the internal diameter with respect to that of the flexible pipe, this inducing additional, likewise inadmissible head losses.

Furthermore, one of the principal advantages of composite substances based on thermoplastics resins is that they may contain relatively long fibers, i.e. whose length may exceed 20 mm. Now, in a system provided with a flexible pipe, the long fibers risk being broken when passing the connections. Finally, whatever precautions are taken at the level of the supply or measuring devices, the temperature of the substance to be injected cannot be controlled when it transits in the flexible pipe, the latter being able to be several meters long, with the result that heat exchanges lead to the reduction in the temperature of the composite substance, which is detrimental to its fluidity and moulding properties.

U.S. Pat. No. 5,540,580 describes a system for injection of non-reinforced plastics material, provided with a supply line formed by articulated sections. The temperature control of the material in this line is provided by means of systems involving a small internal diameter of the line, hence considerable head losses.

SUMMARY OF THE INVENTION

The invention aims at solving these problems and at proposing a system of injection of composite substance capable of functioning with thermoplastics resins or thermosettable resins, including in the case of the injector being placed on a mobile part of the mould.

In this spirit, the invention relates to a system of injection of composite substance inside a forming mould, said system comprising a supply device equipped with a piston, at least one measuring device also equipped with a piston, and at least one line for supplying the mould with composite substance, characterized in that said line presents a substantially constant internal cross-section and is formed by articulated tube sections, said tubes being double-sheathed so as to allow the circulation of a heat-exchange fluid.

Thanks to the invention, the head losses induced in the line formed by articulated tube sections may be determined with great precision, particularly by calculation, and remain substantially constant whatever the position of this articulated line. In effect, the tubes conserve a substantially rectilinear constant geometry whatever their relative positions. Moreover, the circulation of a heat-exchange fluid makes it possible to maintain the composite substance injected at a temperature suitable for the moulding process, including when the articulated line has a length of several meters. Finally, the line formed by articulated tube sections does not comprise any connection with internal cross-section reduced with respect to the rest of the line, with the result that the fibers included in the substance to be injected do not risk being broken when passing such connections. The substantially constant internal cross-section of the line guarantees that no shear of the fibers takes place during the movements of the articulated line.

According to a first advantageous aspect of the invention, the line formed by articulated tube sections includes at least one rotating connection adapted to resist fluid pressures of the order of 350 bars. The use of a rotating connection makes it possible to obtain a degree of freedom necessary for the function of articulation of the line without having a negative influence on the head losses induced by the latter. In that case and according to another advantageous aspect of the invention, the rotating connection comprises a male sleeve penetrating in a female sleeve, these sleeves together defining an interstice provided with balls and each being associated with a bend. This construction guarantees that the rotating connection withstands the desired pressures and allows the articulation of the line of the system of the invention.

According to another advantageous aspect of the invention, the internal cross-section of the line formed by sections of tubes, is substantially constant. This makes it possible to maintain the head losses induced, at a minimum level.

According to a first embodiment of the invention, the line formed by tube sections is interposed between the measuring device and the mould. According to a second embodiment of the invention, the line formed by tube sections is interposed between the supply device and the measuring device. In that case, it may be provided that the measuring device be fixed on a mobile part of the mould. It thus forms with the injection device a compact assembly inside which the head losses and the variations in temperature may be optimized at their minimum values.

According to another advantageous aspect of the invention, the system comprises at least one injector mounted in the mould, this injector comprising a space for circulation of heat-exchange fluid up to the immediate proximity of the opening of the injector. This aspect of the invention makes it possible to control the temperature of the composite substance injected, up to its introduction in the mould.

According to another advantageous aspect of the invention, a thermal connection is placed around the injector in the mould. This aspect of the invention makes it possible to maintain the substance to be injected at a temperature different from that of the mould, up to its point of injection in the mould.

According to another advantageous aspect of the invention, the supply device and/or the measuring device and/or the injection device are double-sheathed so as to allow circulation of a heat-exchange fluid. This aspect of the invention thus makes it possible, in cooperation with the line formed by double-sheathed tubes, to control the temperature of the substance to be injected all along the injection line.

BRIEF DESCRIPTION OF THE DRAWINGS

The invention will be more readily understood and other advantages thereof will appear more clearly in the light of the following description of two embodiments of a system for injection of composite substance in accordance with its principle, given solely by way of example and made with reference to the accompanying drawings, in which:

FIG. 1 is a diagram of a system for injection of composite substance according to a first embodiment of the invention;

FIG. 2 is a transverse cross-section of a rotating connection and of the end of two tubes belonging to the device of FIG. 1;

FIG. 3 is a view in section of the terminal part of an injection device used with the system of FIG. 1; and FIG. 4 is a view similar to FIG. 1 for a system according to a second embodiment of the invention.

The system for injection of composite substance shown in FIG. 1 comprises a reservoir 1 in which is temporarily stored a composite surface which may be made from thermosettable resin, such as polyester, vinylester or a phenolic resin, or from thermoplastics resin, such as a resin belonging to the polyolefin family. This resin may be reinforced with reinforcing fibers based on glass, carbon or any other suitable material. An Archimedean screw 2 is disposed at the foot of the reservoir 1 and controlled by a motor 2a in order to convey the substance to be injected up to a supply device 3 provided with a packing piston 4. At the outlet of the supply device 3 there is connected a measuring device 5 likewise equipped with a piston 6, pistons 4 and 6 are displaced by means of electrical or pneumatic devices known to the person skilled in the art, their position being able to be detected by means of encoders or any other equivalent means.

The substance is injected in a mould 10 formed essentially by a mobile die 11 and a fixed punch 12. The die 11 is periodically moved apart from the punch 12 in order to allow the moulded pieces to be removed. An injection device 13 is connected with the interior volume 10a of the mould thanks to a bore 14 made in the die 11. The injection device may be of any known type and, in particular, be in accordance with the technical teaching of EP-A-0 606 037.

According to the invention, between the measuring device 5 and the injection device 13 there is inserted a line 20 formed by tube sections 21 connected together by rotating connections 22. The tubes 21 are double-sheathed including a composite carrying tube 21 and a generally concentric surrounding heat exchange tube 21', with the result that a heat-exchange liquid, such as an oil based on a mixture of synthetic alkylbenzenes can circulate in tube 21', as represented by arrows F. The oil based on synthetic alkylbenzenes has the noteworthy property of withstanding high temperatures, or the order of 290° C., without noteworthy degradation. In the same way, it may be provided that the Archimedean screw 2, the supply device 3, the measuring device 5 and/or the injection device 13 be double-sheathed so as to allow the circulation of a heat-exchange fluid, this likewise being represented by arrows F in FIG. 1. The heat-exchange fluid may be the same as that described hereinabove, in which case a common heat-exchange fluid supply circuit may be provided; it may also be question of another heat-exchange fluid, which makes it possible to maintain these different enclosures at temperatures different from one another.

The rotating connections 22 serving for articulation are adapted to withstand fluid pressures of the order of 350 bars. to that end, and as is more clearly apparent in FIG. 2, they comprise a female sleeve 30 and a male sleeve 31 on which are respectively fixed two bends 32 and 33, these bends themselves being connected to two tubes 21. The bends 32 and 33 are welded on the sleeves 30 and 31, the welding beads being referenced 34. A joint by welding allows this assembly to withstand high pressures. An interstice 35 is formed between the sleeves 30 and 31, it defines circular grooves in which may be inserted balls 36 by means of opening closed by stoppers 37. O-rings 38 are disposed in grooves 39 of the male sleeve 31, near the ends of the interstice 35. This rotating connection therefore allows a relative movement of two tubes 21 in the plane of FIG. 1. It will be noted that the internal cross-section of the tubes 21, the bends 32 and 33 and the sleeves 30 and 31 is substantially constant, with the result that the presence of the rotating connections 22 in the line formed between the measuring device 6 and the injection device 13 does not induce any specific head losses, which is essential at the pressures of use in question. Moreover, the fibers contained in the composite substance do not risk being broken when passing these rotating connections.

The injection device or injector, partially shown on a larger scale in FIG. 3, is mounted on the mobile die 11. In its terminal part, it comprises a space 15 for circulation of a heat-exchange fluid such as the oil mentioned above. This space 15 may be provided with internal fins or ribs 15a intended to promote guiding of the heat-exchanger liquid up to the immediate proximity of the opening 13a of the injector 13, as well as the heat exchanges. These ribs 15a may in particular have a helicoidal form. In this way, the temperature of the composite substance to be injected may be controlled up to its point of injection in the internal volume 10a of the mould 10. This is particularly advantageous in the case of a composite substance based on thermoplastics resin being used, insofar as the mould 10 is maintained at a temperature of the order of 70° while the thermoplastics material is injected at a temperature of the order of 250° C. The heat-exchange fluid present in the space 15 therefore enables the thermoplastics resin to be heated.

In the case of use of the device of the invention with a thermosettable resin, the mould is heated to a temperature of the order of 170° C, while the resin is injected at a temperature of the order of 70° C. In that case, the circulation of heat-exchange liquid in space 15 makes it possible to cool the substance before it is injected in the volume 10a.

In order to facilitate maintenance of the substance to be injected at a temperature different from that of the mould, it may also be provided that a heat-insulation connection 16 be placed around the injector 13 in the die 11, with the result that it limits the heat-exchanges between the injector 13 and the mould 10.

In the second embodiment of the invention shown in FIG. 4, elements similar to those of the embodiment of FIGS. 1 to 3 bear identical references. This embodiment differs from the preceding one essentially in that the measuring device 5 is installed on the mobile die 11 of the mould 10, with the result that circulation of composite substance to be injected between the measuring device 5 and the injector 13 takes place over a minimum distance. This contributes to a better precision of measurement. In that case, the line 10 formed by sections of tubes 21 is interposed between the supply device 3 and the measuring device 5. It performs the same function as before, allowing the relative movements of the die 11 with respect to the punch 10 without inducing inadmissible head losses or variations in temperature not compatible with the process carried out.

Whatever the embodiment of the invention, a plurality of measuring devices 5 may be associated with a single common supply device 3. A plurality of lines 20 are in that case used in parallel.

What is claimed is:

1. System for injection of thermoplastic and thermosettable composite resin substances which include reinforcing fibers, the system including a forming mold, a supply device equipped with a piston, at least one measuring device equipped with a piston, at least one line for supplying said forming mold with a composite resin substance connected between said supply device and said forming mold, said at least one line including a plurality of articulated tube sections connected to one another by pairs of spaced bends and an intermediate rotable connection sleeve, each of said plurality of articulated tube sections being double sheathed having an inner composite conducting tube and an outer sheath spaced from and surrounding said inner composite conducting tube to thereby define a circulation heat exchange passageway therebetween, each of said inner composite conducting tubes of said plurality of articulated tube sections, bends and rotable connection sleeves having equal and constant internal cross-sections so as to not induce head losses and to reduce risk of fiber damage, and means to allow circulation of a heat-exchange fluid within each said circulation heat exchange passageway.

2. System for injection according to claim 1 wherein each said rotable connection sleeve includes a male sleeve penetrating in a female sleeve, said male and female sleeves defining therebetween an interstice provided with balls and each of said male and female sleeves being connected to one of said bends.

3. System for injection according to claim 1, wherein said supply device, said at least one measuring device and said mold are double sheathed to create areas for circulation of a heat exchange fluid.

4. System for injection according to claim 1 wherein said at least one line is interposed between said at least one measuring device and said mold.

5. System for injection according to claim 1, wherein said at least one line is interposed between said supply device and said at least one measuring device.

6. System for injection according to claim 1, wherein at least one of said at least one measuring device, said mold, and said supply device is double sheathed to create an area for circulation of a heat exchange fluid.

7. System for injection of thermoplastic and thermosettable composite substances which include reinforcing fibers, the system including a forming mold, a supply device equipped with a piston, at least one measuring device equipped with a piston, at least one line for supplying said forming mold with a composite resin substance connected between said supply device and said forming mold, said at least one line including a plurality of tube sections which are connected to one another by a pair of spaced bends and an intermediate rotable connection between each pair of bends, each of said articulated tube sections being double sheathed having an inner composite conducting tube and an outer sheath spaced from and surrounding said inner composite conducting tube to thereby define a circulation heat exchange passageway therebetween, each of said inner composite conducting tubes, said pairs of spaced bends and said intermediate rotable connection sleeves having internal cross sections which are equal and constant therethrough, at least one injector mounted in said mold, a sheath provide about said at least one injector defining a space surrounding said injector for circulation of heat-exchange fluid which space extends into proximity of an opening of said at least one injector into said mold.

8. System for injection according to claim 7, wherein a heat-insulation connection is placed around said at least one injector.

9. System for injection according to claim 7 wherein said supply device and said at least one measuring device are double-sheathed so as to allow circulation of a heat-exchange fluid about inner chambers of said supply device and said at least one measuring device.

* * * * *